(12) United States Patent
Gothe et al.

(10) Patent No.: US 11,776,289 B2
(45) Date of Patent: Oct. 3, 2023

(54) METHOD AND ELECTRONIC DEVICE FOR PREDICTING PLURALITY OF MULTI-MODAL DRAWINGS

(71) Applicant: SAMSUNG ELECTRONICS CO., LTD., Suwon-si (KR)

(72) Inventors: Sourabh Vasant Gothe, Karnataka (IN); Rakshith S, Karnataka (IN); Jayesh Rajkumar Vachhani, Karnataka (IN); Yashwant Singh Saini, Karnataka (IN); Barath Raj Kandur Raja, Karnataka (IN); Himanshu Arora, Karnataka (IN); Rishabh Khurana, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/740,585

(22) Filed: May 10, 2022

(65) Prior Publication Data
US 2022/0301331 A1 Sep. 22, 2022

Related U.S. Application Data

(63) Continuation of application No. PCT/KR2022/003647, filed on Mar. 16, 2022.

(30) Foreign Application Priority Data

Mar. 17, 2021 (IN) .............................. 202141011324
Mar. 3, 2022 (IN) .............................. 202141011324

(51) Int. Cl.
*G06V 10/44* (2022.01)
*G06V 30/32* (2022.01)

(52) U.S. Cl.
CPC ............ *G06V 30/347* (2022.01); *G06V 30/36* (2022.01)

(58) Field of Classification Search
CPC ......... G06V 10/255; G06V 10/44–457; G06V 30/00–43; G06F 16/40–587
See application file for complete search history.

(56) References Cited

U.S. PATENT DOCUMENTS

2014/0365949 A1* 12/2014 Xia ....................... G06F 3/0482
715/780
2015/0379336 A1 12/2015 Hoshi et al.
(Continued)

OTHER PUBLICATIONS

PCT International Search Report dated Jun. 22, 2022 for PCT/KR2022/003647.
(Continued)

*Primary Examiner* — Sean T Motsinger
(74) *Attorney, Agent, or Firm* — Nixon & Vanderhye P.C.

(57) ABSTRACT

Embodiments herein disclose a method and electronic device for predicting multi-modal drawings. The method includes: receiving, by the electronic device, at least one of a text input and strokes of a drawing and determining, by the electronic device, features associated with the text input and features associated with the strokes of the drawing. The method includes classifying, by the electronic device, the features associated with the text input and the features associated with the strokes of the drawing into one of a dominant feature and a non-dominant feature and performing, by the electronic device, early concatenation or late concatenation of the features based on the classification; classifying, by the electronic device, the strokes of the drawing based on the concatenation into a category using a deep neural network (DNN) model; and predicting, by the electronic device, primary drawings corresponding to the category.

16 Claims, 18 Drawing Sheets

(56) References Cited

U.S. PATENT DOCUMENTS

| | | |
|---|---|---|
| 2017/0308289 A1 | 10/2017 | Kim |
| 2018/0107650 A1 | 4/2018 | Calvo et al. |
| 2018/0300542 A1* | 10/2018 | Waddell .............. G06V 30/387 |
| 2022/0301331 A1* | 9/2022 | Gothe .................... G06V 30/32 |

OTHER PUBLICATIONS

Francesco Barbieri et al., "Multimodal Emoji Prediction" dated Apr. 17, 2018, sections 3.1-3.2, 4.-4.1, 9 pgs.

Examination Report dated Nov. 10, 2022 issued by the Indian Patent Office for Indian Patent Application No. 202141011324.

Ha et al., "A Neural Representation of Sketch Drawings", May 19, 2017, 15 pages, https://arxiv.org/pdf/1704.03477.pdf.

Carbune et al., "Fast Multi-language LSTM-based Online Handwriting Recognition", Jan. 24, 2020, 14 pages, https://arxiv.org/pdf/1902.10525.pdf.

"Recurrent Neural Networks for Drawing Classification", 2020, 10 pages, https://github.com/tensorflow/docs/blob/master/site/en/r1/tutorials/sequences/recurrent_quickdraw.md.

Ha et al., Sketch-RNN Demos, Jun. 2017, 2 pages, https://experiments.withgoogle.com/sketch-rnn-demo.

Ha, "Teaching Machines to Draw", Apr. 13, 2017, 7 pages, https://ai.googleblog.com/2017/04/teaching-machines-to-draw.html.

Ha et al., "Draw Together with a Neural Network", Jun. 26, 2017, 5 pages, https://magenta.tensorflow.org/sketch-rnn-demo.

Feuz et al., "RNN-Based Handwriting Recognition in Gboard", Mar. 7, 2019, 3 pages, https://ai.googleblog.com/2019/03/rnn-based-handwriting-recognition-in.html.

"Bézier curve", Wikipedia, last edited Apr. 21, 2022, 11 pages, https://en.wikipedia.org/wiki/B%C3%A9zier_curve.

Deselaers et al., "Introducing the Kaggle "Quick, Draw!" Doodle Recognition Challenge", Quick Draw, Sep. 28, 2018, 3 pages, https://quickdraw.withgoogle.com/.

\* cited by examiner

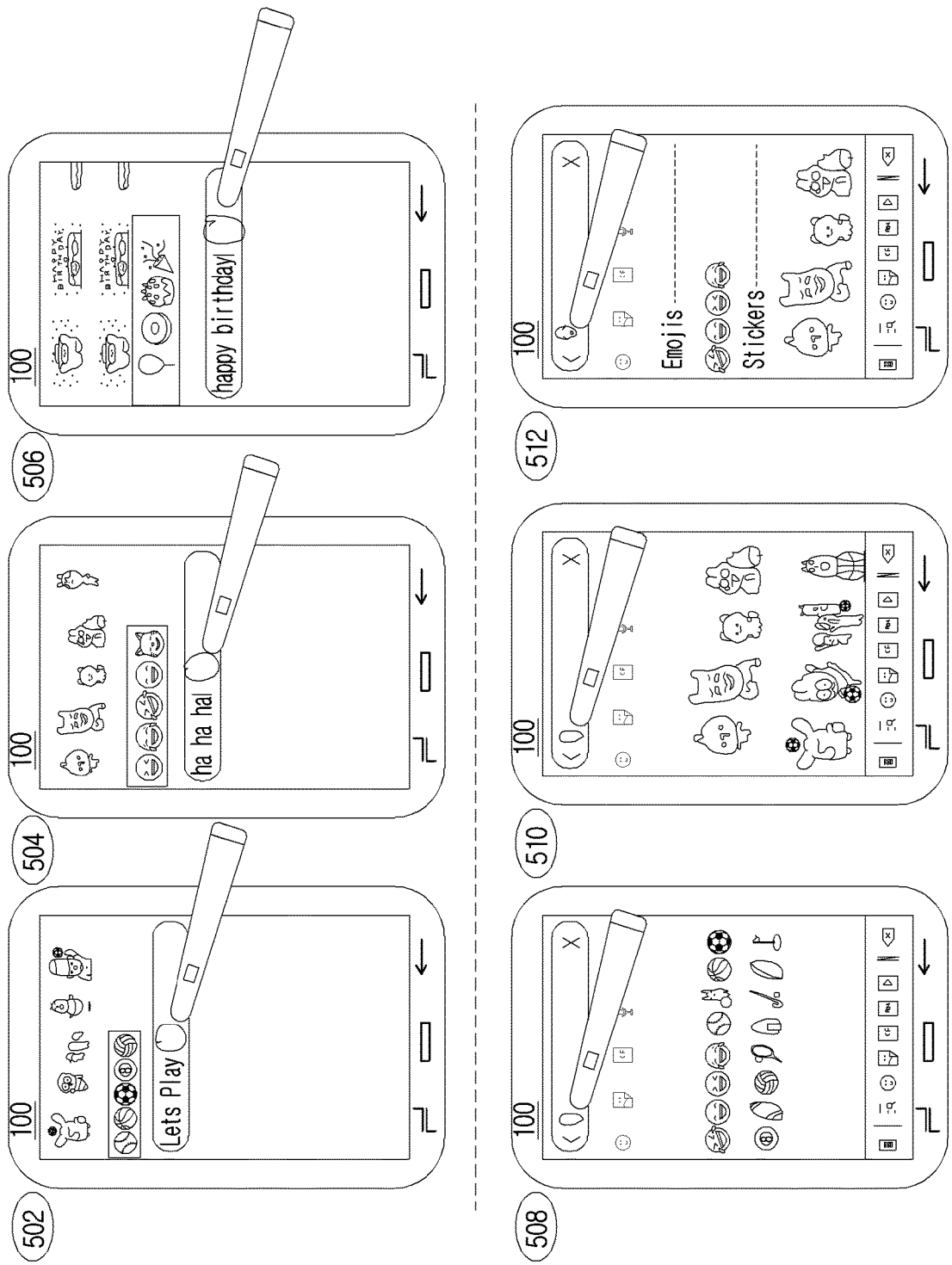

FIG. 6A

| Case | Text | Stroke number | Stroke details (x, y, timestamp) | Stroke number | Text | Text |
|---|---|---|---|---|---|---|
| Case 1 | 1."ha ha ha"<br>2.Empty token | 1 | 475.0, 367.0, 67231620<br>455.0, 383.0, 67231679<br>...<br>433.0, 500.0, 67232397<br>433.0, 500.0, 67232404 | 67232404 | | |
| | 1."ha ha ha"<br>2.Empty token | 2 | 601.0, 838.0, 67232820<br>600.0, 864.0, 67232897<br>601.4037, 901.8998, 67232909....<br>661.0, 1148.0, 67233015<br>661.0, 1148.0, 67233023 | 67233023 | | |
| | 1."ha ha ha"<br>2.Empty token | 3 | 625.0, 824.0, 67233156<br>663.0, 809.0, 67233257<br>...<br>561.7588, 1246.4965, 67233694<br>568.0, 1244.0, 67233699 | 67233699 | | |
| | 1."ha ha ha"<br>2.Empty token | 4 | 638.0, 891.0, 67233892<br>616.0, 889.0, 67233950<br>...<br>296.8975, 885.1261, 67234062<br>302.0, 883.0, 67234067 | 67234067 | | |
| Case 2 | 1."Lets play"<br>2.Empty token | 1 | 560.0, 373.0, 67302012<br>526.0, 399.0, 67302078<br>...<br>447.0, 570.0, 67302987 | 67302987 | | |
| | 1."Lets play"<br>2.Empty token | 2 | 451.0, 858.0, 67303832<br>462.0, 832.0, 67303923<br>...<br>679.0, 661.0, 67304098 | 67304098 | | |
| | 1."Lets play"<br>2.Empty token | 3 | 601.0, 941.0, 67305162<br>607.0, 955.0, 67305234<br>...<br>678.0, 1179.0, 67305351 | 67305351 | | |

FIG. 14

- Currently supported emoji : 63 [emoji list]

| EMOJI | MIN STROKES | MAX STROKES | AVG | MAX TOUCHPOINTS | BIG-DATA TOP EMOJI | DRAWING EFFORT | SELECTED |
|---|---|---|---|---|---|---|---|
| ☺ | 3 | 5 | 4 | 110 | 1 | EASY | Yes – First 7 |
| 😀 | 3 | 12 | 7.4561 | 140 | 0 | DIFFICULT | Yes – First 7 |
| ◇ | 1 | 3 | 1.5645 | 99 | 1 | EASY | Yes – First 7 |
| ↗ | 1 | 2 | 1.0427 | 44 | 1 | EASY | Yes – First 7 |
| ☀ | 2 | 20 | 10.364 | 486 | 0 | VERY DIFFICULT | Yes – First 7 |
| ☁ | 1 | 3 | 1.2368 | 212 | 0 | EASY | Yes – First 7 |
| 😐 | 5 | 9 | 6.5 | 159 | 1 | DIFFICULT | Yes – First 30 |
| 😊 | 3 | 6 | 4.0952 | 173 | 1 | MODERATE | Yes – First 30 |
| 😎 | 3 | 7 | 5.0208 | 109 | 0 | DIFFICULT | Yes – First 30 |
| 😶 | 3 | 6 | 4.0526 | 101 | 0 | MODERATE | Yes – First 30 |
| 😑 | 4 | 11 | 6.4949 | 108 | 0 | DIFFICULT | Yes – First 30 |
| 😕 | 5 | 14 | 7.9802 | 146 | 1 | DIFFICULT | Yes – First 30 |

METHOD AND ELECTRONIC DEVICE FOR PREDICTING PLURALITY OF MULTI-MODAL DRAWINGS

CROSS REFERENCE TO RELATED APPLICATION

This application is a bypass continuation of International Application No. PCT/KR2022/003647, filed on Mar. 16, 2022, which is based on and claims priority to Indian Provisional Application No. 202141011324, filed on Mar. 17, 2021, in the Indian Patent Office and Indian Patent Application No. 202141011324, filed on Mar. 3, 2022, in the Indian Patent Office, the disclosures of which are incorporated by reference herein in their entireties.

BACKGROUND

Field

The disclosure relates to electronic devices, and for example, to a method and an electronic device for predicting a plurality of multi-modal drawings with minimum number of user strokes using at least one of a text input and user strokes of a drawing.

Description of Related Art

In general, with technological advancements in electronic devices various features have been introduced and evolved over the years. One such feature is introduction of direct writing (with inclusion of Handwriting engines) with stylus (such as for example, S-Pen) based models on a screen of touch based electronic devices. However, direct writing on the screen of the an electronic device does not support emoji drawing due to various challenges associated with the same and also due to unavailability of commercial-level deep neural network (DNN) techniques (with commercial KPIs).

Further, even if a user provides strokes indicating a drawing, current electronic devices are not capable of classifying the drawings to find emoji-s, stickers, etc. As a result, the user will have to provide the complete set of strokes so that the electronic device can classify the drawing which becomes cumbersome. Also, different modalities such as for example, text, drawing features, etc. are not considered to classify the drawings from the user strokes. This impacts results of the Handwriting engine and the end user experience. Furthermore, none of the existing probable emoji scope utilizes emoji-emoji prediction.

Therefore, a simple drawing classification technique is required which takes multi-modality into consideration and also suggest relevant drawings/emoji-s with less number of user strokes. Thus, it is desired to address the above mentioned disadvantages or other shortcomings or at least provide a useful alternative.

SUMMARY

Embodiments of the disclosure provide a method and an electronic device for predicting a plurality of multi-modal drawings with minimum number of user strokes using at least one of a text input and user strokes of a drawing. The method includes segregating features associated with text input and the features associated with user strokes into dominant and non-dominant features and performing concatenation of the features associated with text input and the features associated with user strokes. Further, the prediction for the drawing provided by the user stroke is based on concatenation. A user need not complete the drawings by providing complete user strokes as the disclosure efficiently predicts the drawing even with minimum number of user strokes, thereby reducing user effort and enhancing user experience.

Accordingly example embodiments herein disclose a method for predicting multi-modal drawing by an electronic device. The method includes: receiving, by the electronic device, at least one of a text input and strokes of a drawing on a screen of the electronic device and determining, by the electronic device, features associated with the text input and features associated with the strokes of the drawing. Further, the method includes: classifying, by the electronic device, the features associated with the text input and the features associated with the strokes of the drawing into one of a dominant feature and a non-dominant feature and performing, by the electronic device, one of an early concatenation and a late concatenation of the features associated with the text input and the features associated with the strokes of the drawing based on the classification. Furthermore, the method includes: classifying, by the electronic device, the strokes of the drawing based on the concatenation into at least one category using a deep neural network (DNN) model and predicting, by the electronic device, a plurality of primary drawings corresponding to the at least one category.

In an example embodiment, classifying, by the electronic device, the features associated with the text input and the features associated with the strokes of the drawing into one of the dominant feature and the non-dominant feature includes: determining, by the electronic device, that one of: the features associated with the text input and the features associated with the strokes of the drawing is completely available, and one of a context associated with the text input and a context associated with the strokes of the drawing is coherent. Further, the method includes: classifying, by the electronic device the features associated with the text input is the dominant feature and the features associated with the strokes of the drawing is the non-dominant feature, in response to determining that at least one of: the features associated with the text input being completely available and the context associated with the text input being coherent, and the features associated with the strokes of the drawing being the dominant feature and the features associated with the text input being the non-dominant feature, in response to determining that at least one of: the features associated with the strokes of the drawing is completely available and the context associated with the strokes of the drawing is coherent.

In an example embodiment, classifying, by the electronic device, the strokes of the drawing based on the concatenation into the at least one category using the DNN model includes: identifying, by the electronic device, a weight of each of text layers and drawing layers of the DNN model based on the determined dominant feature and applying, by the electronic device, a dynamic-interpolation with the identified weights for each of the text layers and the drawing layers of the DNN model. The method also includes: concatenating, by the electronic device, the features associated with the text input and the features associated with the strokes of the drawing; and classifying, by the electronic device, the strokes of the drawing based on the concatenation into at least one category.

In an example embodiment, the method further includes: receiving, by the electronic device, at least one predicted primary drawing of the plurality of predicted primary drawings and determining, by the electronic device, an input row index of the at least one predicted primary drawing. The method also includes: determining, by the electronic device, a word sparse vector for the at least one predicted primary drawing from a document term matrix (DTM) of the at least one predicted primary drawing; and determining, by the electronic device, a plurality of secondary drawings corresponding the at least one predicted primary drawing.

In an example embodiment, the plurality of primary drawings corresponding to the at least one category are provided in a specific order of predictions.

In an example embodiment, predicting, by the electronic device, the plurality of primary drawings corresponding to the at least one category includes: determining, by the electronic device, a drawing-stroke savings ratio (DSR) indicating a number of strokes saved for a user in the drawing input. Further, the method includes: determining, by the electronic device, a specific order of the plurality of drawings corresponding to at least one drawing category; and predicting, by the electronic device, the plurality of primary drawings corresponding to the at least one category, wherein the plurality of primary drawings is predicted with a low number of strokes.

In an example embodiment, the method further includes: receiving, by the electronic device, a next set of strokes and determining, by the electronic device, features of the next set of strokes. The method also includes: determining, by the electronic device, that features of the next set of strokes belongs to at least one of a text and a drawing; resolving, by the electronic device, a conflict whether the features of the next set of strokes belongs to at least one of the text and the drawing, wherein the resolution is performed using one of the DNN model and a Heuristics technique; and predicting, by the electronic device, the next set of strokes to be one of the text and the drawing.

Accordingly example embodiments herein disclose an electronic device for predicting multi-modal drawing. The electronic device includes: a memory, a processor, a communicator comprising communication circuitry and a drawing management controller. The drawing management controller is configured to: receive at least one of a text input and strokes of a drawing on a screen of the electronic device and determine features associated with the text input and features associated with the strokes of the drawing. The drawing management controller is also configured to: classify the features associated with the text input and the features associated with the strokes of the drawing into one of a dominant feature and a non-dominant feature and perform one of an early concatenation and a late concatenation of the features associated with the text input and the features associated with the strokes of the drawing based on the classification. The drawing management controller is also configured to: classify the strokes of the drawing based on the concatenation into at least one category using a DNN model; and predict a plurality of primary drawings corresponding to the at least one category.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the disclosure herein without departing from the true spirit and full scope of the disclosure, and the disclosure and various embodiments herein include all such modifications.

BRIEF DESCRIPTION OF THE DRAWINGS

The disclosure is illustrated in the accompanying drawings, throughout which like reference letters indicate corresponding parts in the various figures. The above and other aspects, features and advantages of certain embodiments of the present disclosure will be more apparent from the following detailed description, taken in conjunction with the accompanying drawings, in which:

FIG. 5 is a diagram illustrating example scenarios of sticker prediction and performing a universal search for the drawing, according to various embodiments;

FIG. 6A is diagram illustrating an example data preparation and feed to SAM-Net DNN model, according to various embodiments;

FIG. 14 is a diagram illustrating various examples of supported emojis, according to various embodiments.

DETAILED DESCRIPTION

Figure 1:
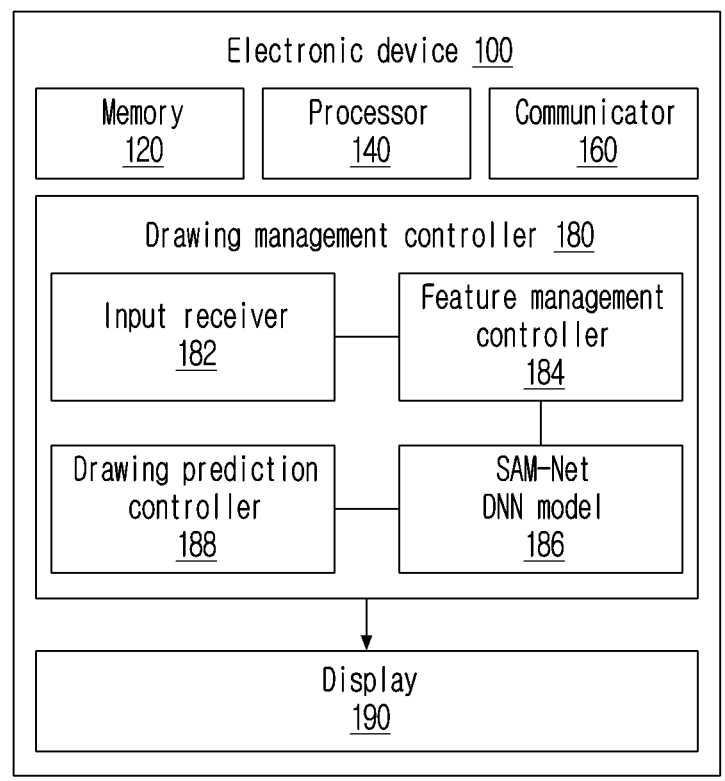
FIG. 1 is a block diagram illustrating an example configuration of an electronic device for predicting multi-modal drawing, according to various embodiments.

The various example embodiments herein and the various features and advantageous details thereof are explained more fully with reference to the non-limiting example embodiments that are illustrated in the accompanying drawings and detailed in the following description. Descriptions of well-known components and processing techniques may be omitted so as to not unnecessarily obscure the disclosure herein. The various example embodiments described herein are not necessarily mutually exclusive, as various embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to aid in easily understanding various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally simply used to distinguish one element from another.

Accordingly the example embodiments herein disclose a method for predicting multi-modal drawing by an electronic device. The method includes receiving, by the electronic device, at least one of a text input and strokes of a drawing on a screen of the electronic device and determining, by the electronic device, features associated with the text input and features associated with the user strokes of the drawing. Further, the method includes: classifying, by the electronic device, the features associated with the text input and the features associated with the strokes of the drawing into one of a dominant feature and a non-dominant feature and performing, by the electronic device, one of an early concatenation and a late concatenation of the features associated with the text input and the features associated with the strokes of the drawing based on the classification. Furthermore, the method includes classifying, by the electronic device, the strokes of the drawing based on the concatenation into at least one category using a deep neural network (DNN) model and predicting, by the electronic device, a plurality of primary drawings corresponding to the at least one category.

Accordingly the various example embodiments herein disclose an electronic device for predicting multi-modal drawing. The electronic device includes a memory, a processor, a communicator comprising communication circuitry and a drawing management controller. The drawing management controller is configured to: receive at least one of a text input and strokes of a drawing on a screen of the electronic device and determine features associated with the text input and features associated with the strokes of the drawing. The drawing management controller is also configured to: classify the features associated with the text input and the features associated with the strokes of the drawing into one of a dominant feature and a non-dominant feature and perform one of an early concatenation and a late concatenation of the features associated with the text input and the features associated with the strokes of the drawing based on the classification. The drawing management controller is also configured to: classify the user strokes of the drawing based on the concatenation into at least one category using a deep neural network (DNN) model; and predict a plurality of primary drawings corresponding to the at least one category.

Conventional methods and systems provide server based solution which includes privacy issues while sending data. Size of the model increases with the increase in number of classes say ~1.5 MB per class, ~250 ms which makes it not feasible for commercialization.

Conventional methods and systems provide image based model which are not capable of taking multi-modal inputs (such as for example, text, image, etc) and therefore provides same outcome, irrespective of the content. For example, the user stroke of a circle drawing always gives same predictions/results.

Unlike to the conventional methods and system, in the disclosure provides semantic-aware multi-modal drawing classification (SAM-Net) with feature-domination technique. The disclosure includes classifying the drawings (Different outcomes for same strokes) with SAM-Net. The disclosure also includes conflict resolution for classification in the drawings when the user provides user strokes of both the text and the drawing.

Referring now to the drawings and more particularly to FIGS. 1 through 14, where similar reference characters denote corresponding features throughout the figure, these are shown various example embodiments.

FIG. 1 is a block diagram illustrating an example configuration of the electronic device (100) for predicting multi-modal drawing, according to various embodiments. Referring to FIG. 1, the electronic device (100) may include, but is not limited to, a laptop, a palmtop, a desktop, a mobile phone, a smart phone, Personal Digital Assistant (PDA), a tablet, a wearable device, an Internet of Things (IoT) device, a virtual reality device, a foldable device, a flexible device, a display device an immersive system, or the like.

In an embodiment, the electronic device (100) includes a memory (120), a processor (e.g., including processing circuitry) (140), a communicator (e.g., including communication circuitry) (160), a drawing management controller (e.g., including various processing circuitry and/or executable program instructions) (180) and a display (190).

The memory (120) is configured to store instructions to be executed by the processor (140). The memory (120) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) is configured to store larger amounts of information. In certain examples, a non-transitory storage medium may store data that can, over time, change (e.g., in Random Access Memory (RAM) or cache).

The processor (140) may include various processing circuitry including one or a plurality of processors. The one or the plurality of processors may include, for example, and without limitation, a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (140) may include multiple cores and is configured to execute the instructions stored in the memory (120).

In an embodiment, the communicator (160) includes an electronic circuit specific to a standard that enables wired or wireless communication. The communicator (160) is configured to communicate internally between internal hardware components of the electronic device (100) and with external devices via one or more networks.

In an embodiment, the drawing management controller (180) may include various processing circuitry and/or executable program instructions including, for example, an input receiver (182), a feature management controller (184), a semantic aware multi-modal network (SAM-Net) deep neural network (DNN) model (186) and a drawing prediction controller (188).

In an embodiment, the input receiver (182) is configured to receive at least one of a text input and user strokes of a drawing on a display (190) of the electronic device (100).

In an embodiment, the feature management controller (184) is configured to determine features associated with the text input and features associated with the user strokes of the drawing and classify the features associated with the text input and the features associated with the user strokes of the drawing into one of a dominant feature and a non-dominant feature. The features associated with the text input includes for example but not limited to number of words/characters, character embedding, word embedding. The features associated with the user strokes of the drawing includes for example but not limited to number of strokes, stroke shape like circle, horizontal line, vertical line, angle etc.

The feature management controller (184) classifies the features into either the dominant feature and the non-dominant feature as based on determining that one of: the features associated with the text input and the features associated with the user strokes of the drawing is completely available, and one of a context associated with the text input and a context associated with the user strokes of the drawing is coherent.

The feature management controller (184) classifies the features associated with the text input as the dominant feature and the features associated with the user strokes of the drawing as the non-dominant feature, in response to determining that at least one of: the features associated with the text input are completely available and the context associated with the text input is coherent. The feature management controller (184) classifies the features associated with the user strokes of the drawing as the dominant feature and the features associated with the text input as the non-dominant feature, in response to determining that at least one of: the features associated with the user strokes of the drawing are completely available and the context associated with the user strokes of the drawing is coherent.

The context associated with the user strokes of the drawing can reflect an activity such as for example but not limited to sports, exercise, running, a commodity like food, drinks, a feeling like hungry, sad, etc. The context associated with the text input can include, for example, but is not limited to, positive, negative, reflecting an emotion, an event, etc.

In an embodiment, the SAM-Net DNN model (186) is configured to perform one of an early concatenation and a late concatenation of the features associated with the text input and the features associated with the user strokes of the drawing based on the classification and classify the user strokes of the drawing based on the concatenation into at least one category using the SAM-Net DNN model (186). The SAM-Net DNN model (186) is configured to classify the user strokes of the drawing based on the concatenation into the at least one category using the SAM-Net DNN model (186) by identifying a weight of each of text layers and drawing layers of the SAM-Net DNN model (186) based on the determined dominant feature and apply a dynamic-interpolation with the identified weights for each of the text layers and the drawing layers of the SAM-Net DNN model (186). Further, the SAM-Net DNN model (186) is configured to concatenate the features associated with the text input and the features associated with the user strokes of the drawing and classify the user strokes of the drawing based on the concatenation into at least one category.

In an embodiment, the drawing prediction controller (188) is configured to determine a drawing-stroke savings ratio (DSR) indicating a number of user strokes saved for a user in the drawing input and determine a specific order of the plurality of drawings corresponding to at least one drawing category and predict the plurality of primary drawings corresponding to the at least one category. The plurality of primary drawings is predicted with a low number of user strokes. The plurality of primary drawings corresponding to the at least one category are provided in a specific order of predictions. The specific order of predictions indicates the priority in which the plurality of primary drawings are predicted to the user and may be for example based on relevance, frequency of usage, etc.

The drawing prediction controller (188) is also configured to receive at least one predicted primary drawing of the plurality of predicted primary drawings and determine an input row index of the at least one predicted primary drawing. Further, the drawing prediction controller (188) is configured to determine a word sparse vector for the at least one predicted primary drawing from a document term matrix (DTM) of the at least one predicted primary drawing and determine a plurality of secondary drawings corresponding the at least one predicted primary drawing. The terms primary and secondary are used for purposes of description and may refer, for example, to emoji to emoji prediction technique explained throughout the disclosure.

The drawing prediction controller (188) is also configured to receive a next set of user strokes, determine features of the next set of user strokes and determine that features of the next set of user strokes belongs to at least one of a text and a drawing. Further, the drawing prediction controller (188) is configured to resolve a conflict whether the features of the next set of user strokes belongs to at least one of the text and the drawing, and predict the next set of user strokes to be one of the text and the drawing. The resolution may be performed using one of the SAM-Net DNN model (186) and a Heuristics technique (explained in detail in FIG. 12B). The conflict whether the features of the next set of user strokes belong to at least one of the text and the drawing may arise not just for the next set of user strokes and can also arise in case of the initial user strokes of the drawing provided by the user and the above resolution technique is applicable for the same.

The drawing management controller (180) may be implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

At least one of the plurality of modules/components of the drawing management controller (180) may be implemented through an AI model. A function associated with the AI model may be performed through memory (120) and the processor (140). The one or a plurality of processors controls the processing of the input data in accordance with a predefined operating rule or the AI model stored in the non-volatile memory and the volatile memory. The predefined operating rule or artificial intelligence model is provided through training or learning.

Being provided through learning may refer, for example, to, by applying a learning process to a plurality of learning data, a predefined operating rule or AI model of a desired characteristic being made. The learning may be performed in a device itself in which AI according to an embodiment is performed, and/or may be implemented through a separate server/system.

The AI model may include a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process may refer to a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

In an embodiment, the display (190) is configured to provide the predicted plurality of primary drawings corresponding to the at least one category to the user. The display (190) is also configured to provide the plurality of secondary drawings corresponding the at least one predicted primary drawing. The terms primary and secondary are used for representative purpose and are related to each other. The display (190) may be implemented using touch sensitive technology and may include, for example, and without limitation, a liquid crystal display (LCD), a light emitting diode (LED), etc.

Although FIG. 1 shows the hardware elements of the electronic device (100) but it is to be understood that other embodiments are not limited thereon. In various embodiments, the electronic device (100) may include less or more number of elements. Further, the labels or names of the elements are used only for illustrative purpose and does not limit the scope of the disclosure. One or more components can be combined together to perform same or substantially similar function.

Figure 2:
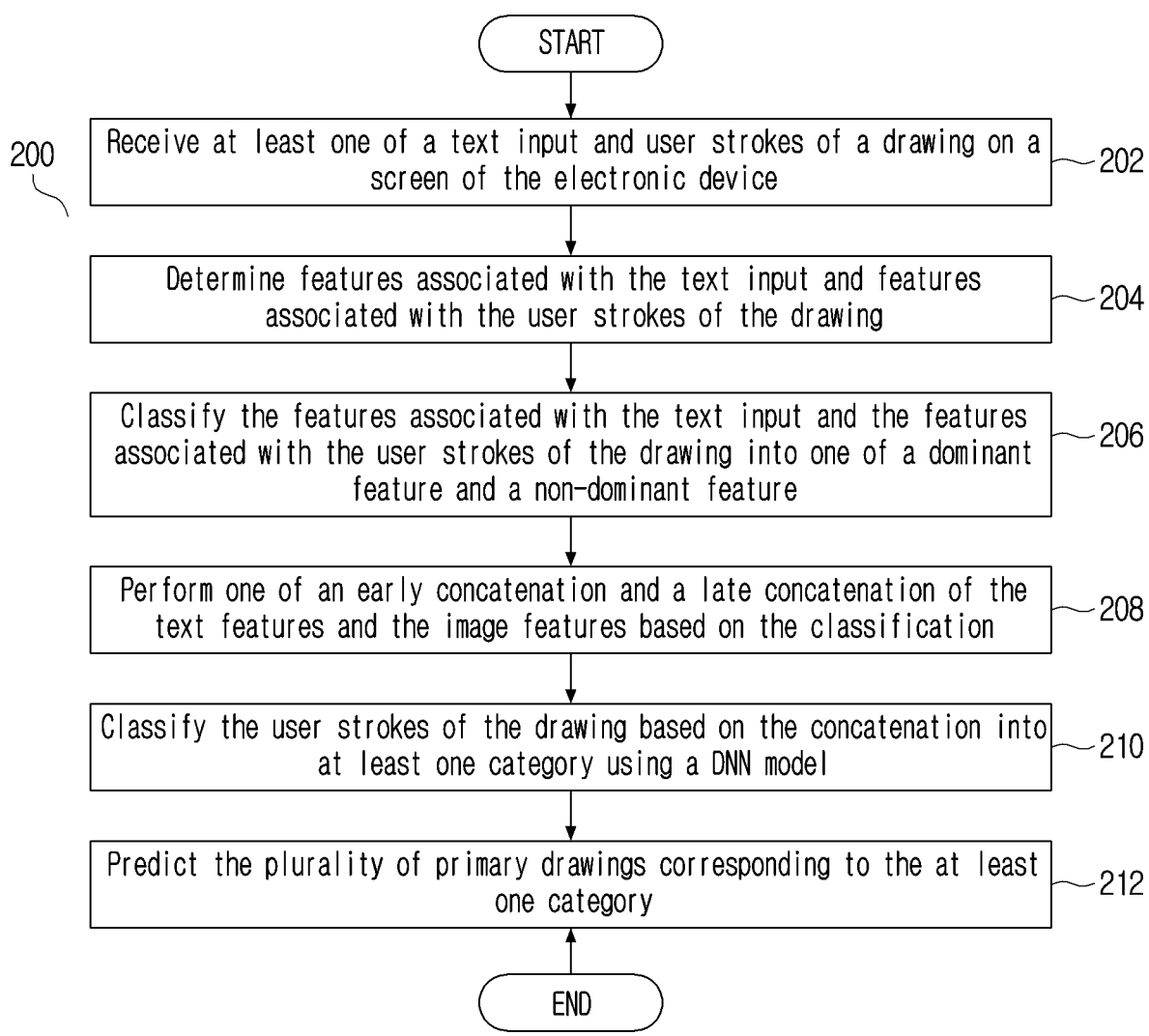
FIG. 2 is a flowchart illustrating an example method for predicting the multi-modal drawing by the electronic device, according to various embodiments.

FIG. 2 is a flowchart (200) illustrating an example method for predicting the multi-modal drawing by the electronic device (100), according to various embodiments.

Referring to FIG. 2, at operation 202, the method includes the electronic device (100) receiving at least one of the text input and the user strokes of the drawing on the screen of the electronic device (100). For example, in the electronic device (100) as illustrated in FIG. 1, the drawing management controller (180) is configured to receive at least one of the text input and the user strokes of the drawing on the screen of the electronic device (100).

At operation 204, the method includes the electronic device (100) determining the features associated with the text input and the features associated with the user strokes of the drawing. For example, in the electronic device (100) as illustrated in FIG. 1, the drawing management controller (180) is configured to determine the features associated with the text input and the features associated with the user strokes of the drawing.

At operation 206, the method includes the electronic device (100) classifying the features associated with the text input and the features associated with the user strokes of the drawing into one of the dominant feature and the non-dominant feature. For example, in the electronic device (100) as illustrated in FIG. 1, the drawing management controller (180) is configured to classify the features associated with the text input and the features associated with the user strokes of the drawing into one of the dominant feature and the non-dominant feature.

At operation 208, the method includes the electronic device (100) performing one of the early concatenation and the late concatenation of the text features and the image features based on the classification. For example, in the electronic device (100) as illustrated in FIG. 1, the drawing management controller (180) is configured to perform one of the early concatenation and the late concatenation of the text features and the image features based on the classification.

At operation 210, the method includes the electronic device (100) classifying the user strokes of the drawing based on the concatenation into at least one category using the SAM-Net DNN model (186). For example, in the electronic device (100) as illustrated in FIG. 1, the drawing management controller (180) is configured to classify the user strokes of the drawing based on the concatenation into at least one category using the SAM-Net DNN model (186).

At operation 212, the method includes the electronic device (100) predicting the plurality of primary drawings corresponding to the at least one category. For example, in the electronic device (100) as illustrated in FIG. 1, the drawing management controller (180) is configured to predict the plurality of primary drawings corresponding to the at least one category.

The various actions, acts, blocks, steps, operations or the like in the method may be performed in the order presented, in a different order or simultaneously. Further, in various embodiments, some of the actions, acts, blocks, steps, or the like may be omitted, added, modified, skipped, or the like without departing from the scope of the disclosure.

Figure 3:
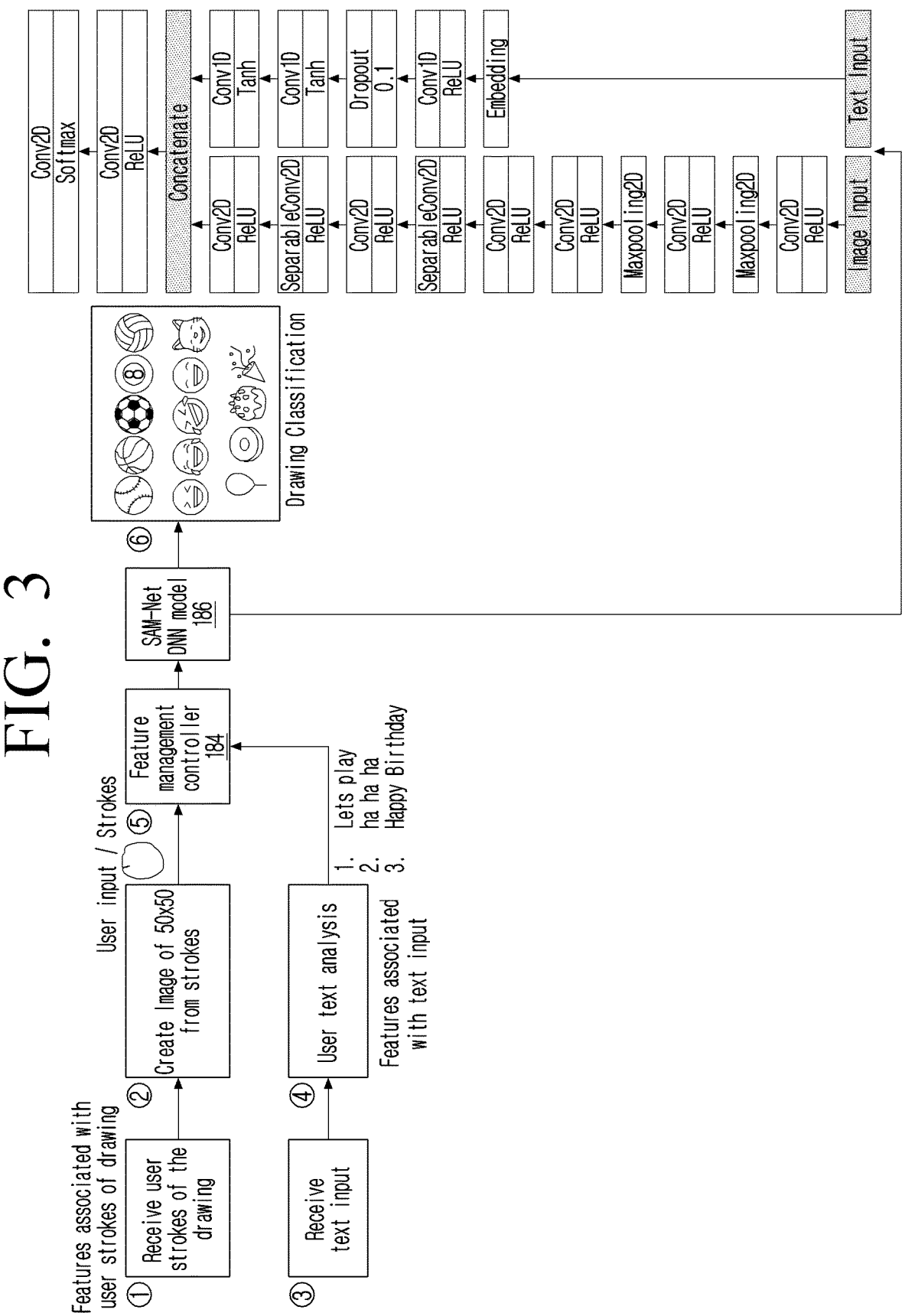
FIG. 3 is a diagram illustrating an example procedure for drawing classification, according to various embodiments.

FIG. 3 is a diagram illustrating an example procedure for drawing classification, according to various embodiments. Referring to FIG. 3, at operation 1, the electronic device (100) receives the user strokes of the drawing and determines the features associated with the user strokes of the drawing. At operation 2, the electronic device (100) generates an image of a predefined (e.g., specified) size such as 50*50 using the user strokes of the drawing. The image of 50*50 of the user strokes of the drawing is as shown at the output of operation 2.

At operation 3, consider that the user along with providing the user strokes of the drawing also provides text input associated with the drawing. At operation 4, the electronic device (100) analyses the text input and determines the features associated with the text input. Here, the features associated with the text input is for example Lets play, ha ha ha and Happy Birthday in different scenarios. The features associated with the text input indicate textual context. At operation 5, both the features associated with the text input and the user strokes are provided to the feature management controller (184) which classifies the dominant feature and the non-dominant feature. Further, at operation 6, the SAM-Net DNN model (186) classifies the drawings into categories. The user stroke provided along with the text input "Lets play", the drawing is categorized as balls associated with various sports. The user stroke provided along with the text input "ha ha ha", the drawing is categorized as smiley emojis. Similarly, the user stroke provided along with the text input "Happy Birthday", the drawing is categorized as emojis related to birthday such as for example, balloons, cakes, doughnuts, etc. based on the shape and number of user strokes provided by the user.

Figure 4:
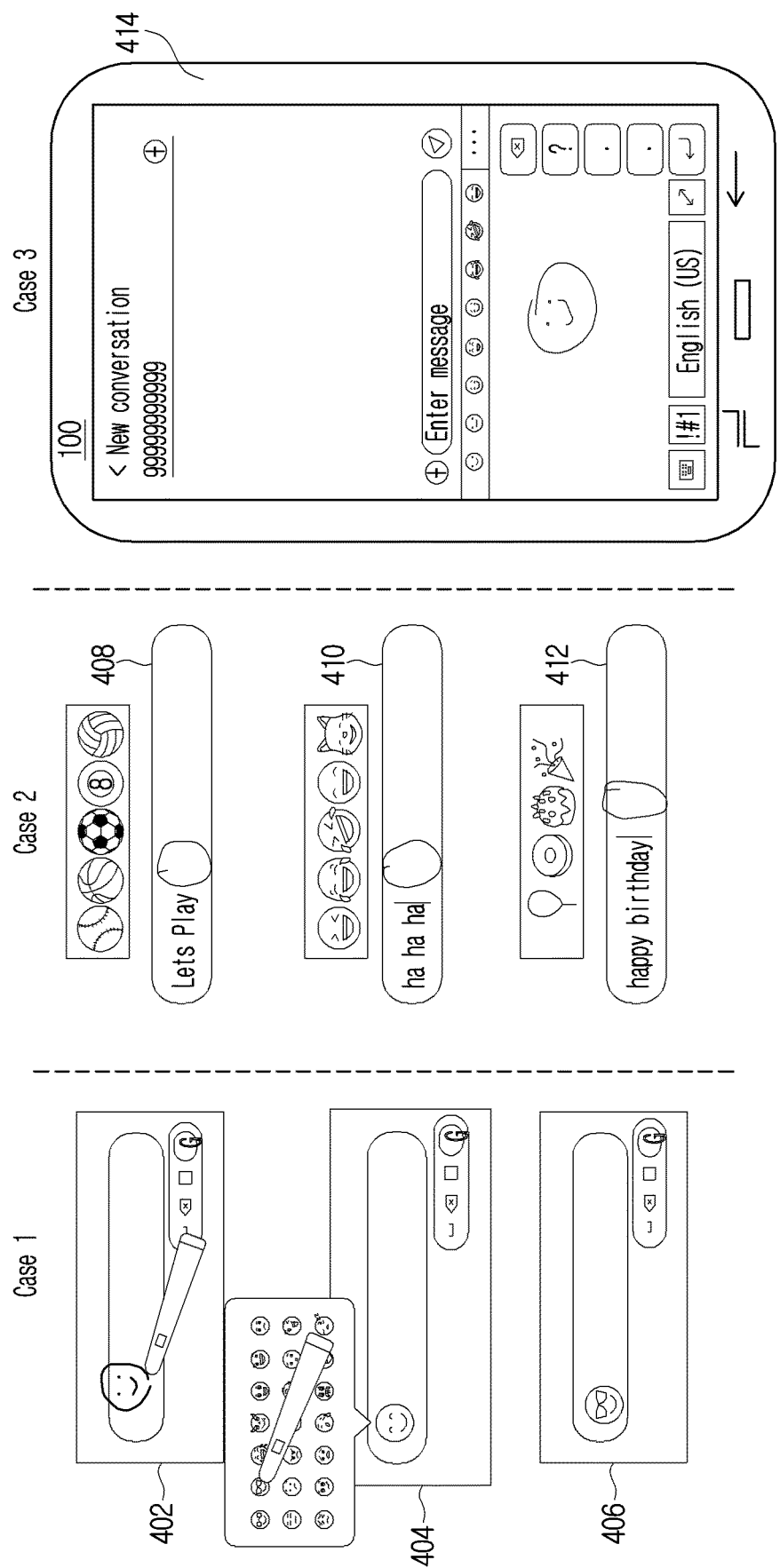
FIG. 4 is a diagram illustrating example scenarios of drawing emojis and classification of the emojis, according to various embodiments.

FIG. 4 is a diagram illustrating example scenarios of drawing emojis and classification of the emojis, according to various embodiments. Referring to FIG. 4, consider a case 1, at operation 402, the user provides the user strokes of the drawing and at operation 404, the electronic device (100) suggests the emojis based on the user strokes of the drawing and at operation 406, the user selects the relevant emoji from the list of suggested emojis.

Consider the case 2. At operation 408, the user provides the user strokes of the drawing along with the text input "Lets play". The electronic device (100) predicts relevant emojis by taking into consideration both the user strokes of the drawing along and the text input. Further, in operation 410, the user provides the same user strokes of the drawing as provided in operation 408. But since the electronic device (100) predicts relevant emojis by taking into consideration both the user strokes of the drawing and the text input, the emojis predicted by the electronic device (100) in operation 410 are different from the emojis predicted by the electronic device (100) in operation 408. Similarly, at operation 412, the electronic device (100) predicts different emojis based on the context of the text input "Happy birthday" for the same user strokes of the drawing provided by the user. The disclosed method allows the electronic device (100) to classify and predict different emojis based on the content of the text input along with the same user strokes of the drawing.

Consider the case 3, at operation 414 the electronic device (100) conventionally includes a handwriting recognition functionality to recognize text provided using the user strokes in a text box of any application in the electronic device (100). The addition of the method to the electronic device (100) enhances the performance of the handwriting recognition functionality in the electronic device (100) by predicting the emojis based on the user strokes (and not just the text) provided in any of the text box. Further, the prediction of the emojis can be based on both the modalities of the user strokes and the text input (not shown in FIG. 4).

FIG. 5 is a diagram illustrating example scenarios of sticker prediction and performing a universal search for the drawing, according to various embodiments. Referring to FIG. 5, the disclosed method can be expanded to include various embodiments once the emojis/drawings are predicted based on the multi-modal inputs such as the text input and the user strokes of the drawings. An example is considered in operation 502, which includes predicting both the emojis and stickers for the text input "Lets play" considered along with the user stroke of the drawing. Similarly, in operation 504, the emojis and stickers are predicted for the text input "ha ha ha" and at operation 506, the emojis and stickers are predicted for the text input "Happy Birthday".

Further, at operation 508 the emojis are provided related to the circle stroke provided in universal search field and at operation 510, only the stickers are provided based on the circle stroke. However, at operation 512, the electronic device (100) fetches and populates all content such as stickers (provided in a stickers tab), emojis (provided in an emoji tab), GIFs, etc.

FIG. 6A is a diagram illustrating an example data preparation and feed to the SAM-Net DNN model (186), according to various embodiments. Referring to FIG. 6A, consider examples, case 1 and case 2 where both the text input and the user strokes of the drawing both are provided for the prediction of the drawings. The SAM-Net DNN model (186) is provided with the text (32 characters) and the features of the user strokes of the drawing as feed. The SAM-Net DNN model (186) recognizes the number of strokes, the text input and the features associated with both the text input and the user strokes and learns. Further, the SAM-Net DNN model (186) utilizes the leaning to classify the drawings and also to predict the right drawings based on the classification.

Figure 6B:
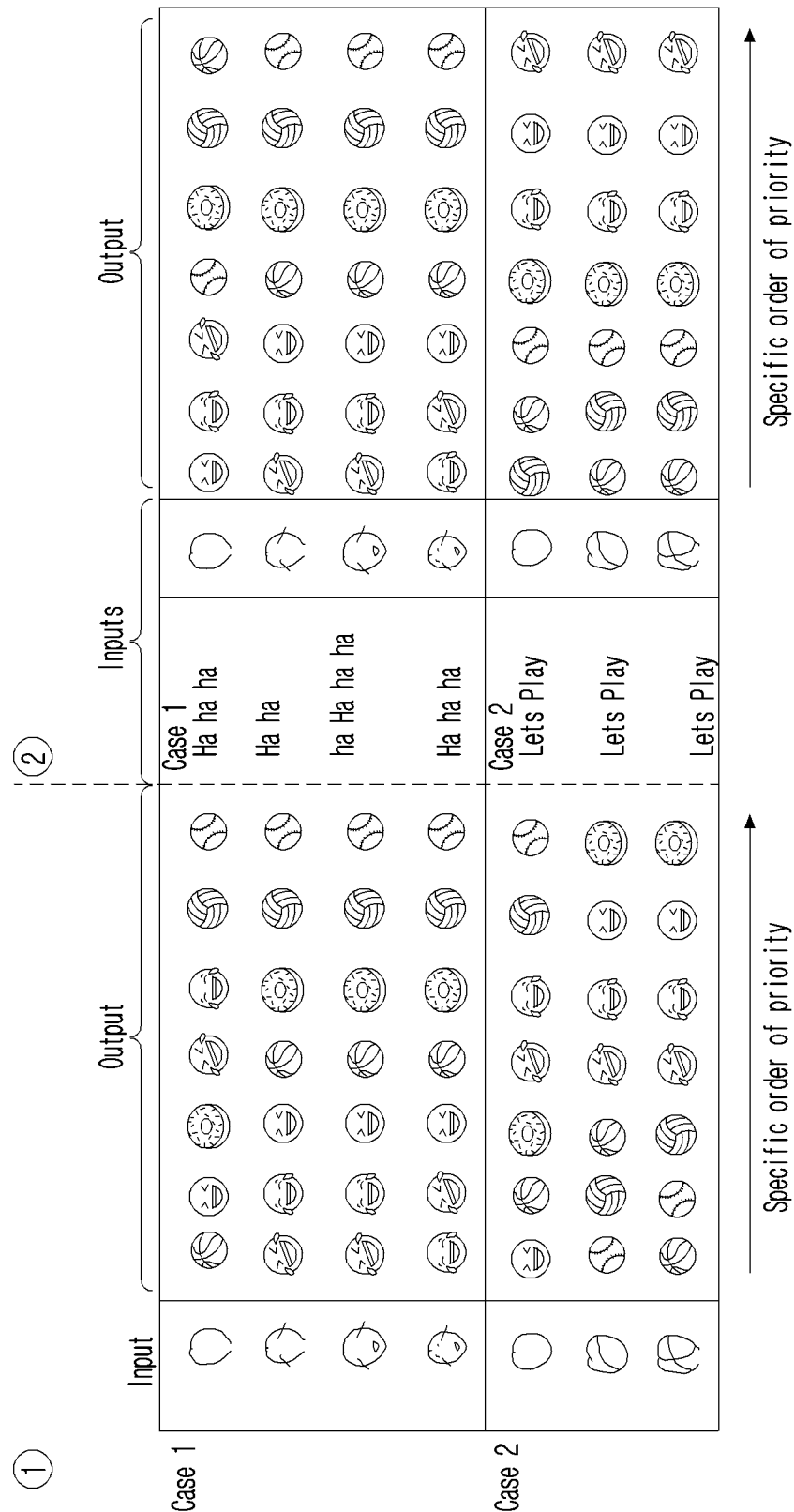
FIG. 6B is a diagram illustrating an example output of the SAM-Net DNN model classifying the drawings, according to various embodiments.

FIG. 6B is a diagram illustrating an example output of the SAM-Net DNN model (186) classifying the drawings, according to various embodiments. Referring to FIG. 6B, at 1, consider that the text input is absent and only the user strokes are provided as input to the electronic device (100) for classifying the drawings. Consider a case 1 where the user is actually trying to provide a laughing emoji. However, as the user begins to provide the strokes the electronic device (100) starts to classify the drawing into either a smiley category or an object category, etc. However, the electronic device (100) requires the user to provide an increased number of the user strokes to correctly classify the drawing into the smiley category and also to provide the exact smiley. Similarly, in the case 2 the user starts to provide the user strokes for a ball. The user will have to provide more number of user strokes so that the electronic device (100) can exactly classify the user strokes as that of the ball.

At 2, consider that the text input is also available along with the user strokes as input to the electronic device (100) for classifying the drawings. Therefore, in the case 1, the text input is provided as "Ha ha ha" along with the user strokes of the drawing. As a result, the electronic device (100) rightly classifies the drawing as a smiley and provides the list of close smileys in the very first operation. Similarly, in the case 2, the text input is provided as "Lets Play" along with the user strokes of the drawing. As a result, the electronic device (100) rightly classifies the drawing as a ball and provides the emojis related to the ball in the order of priority. Further, it can be noted that as the user provides an increased number of the user strokes of the drawings, the electronic device (100) provides the exact emoji that the user is refereeing to in the drawing. Therefore, the method of using the multi-modal inputs to classify the drawing to the right category has high accuracy with low number of strokes, which enhances user experience.

Figure 7:
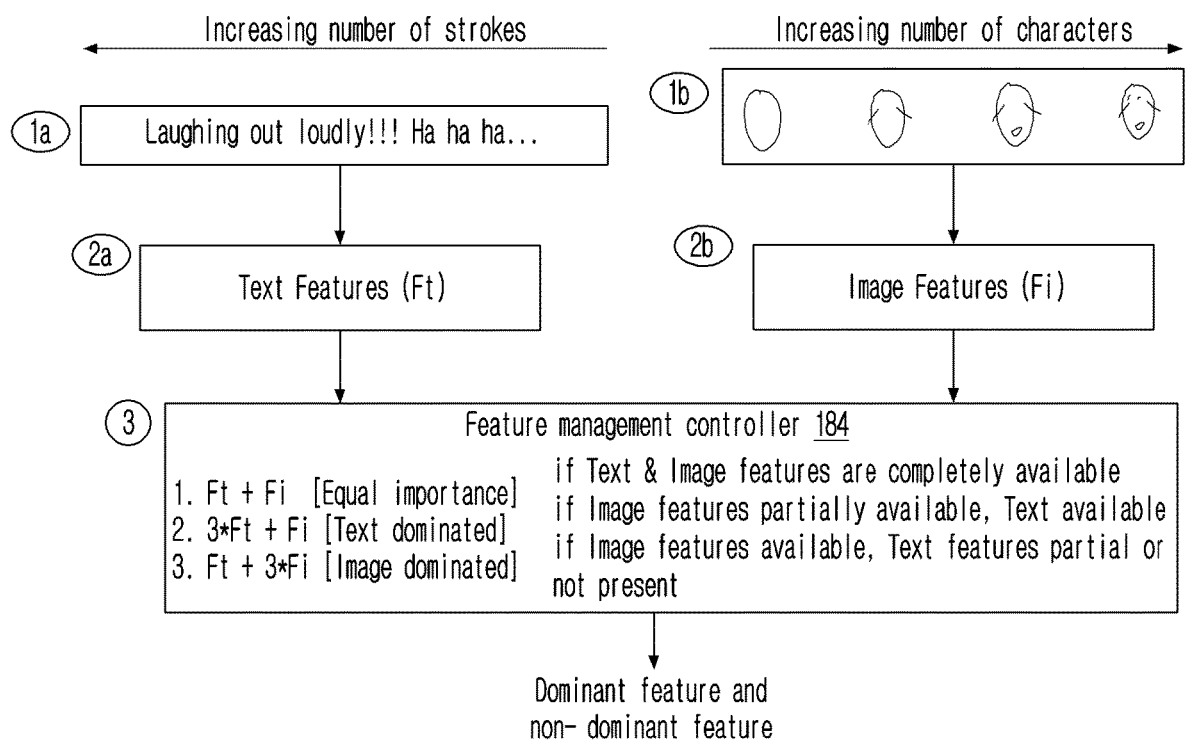
FIG. 7 is a diagram illustrating an example working of a feature management controller of the electronic device, according to various embodiments.

FIG. 7 diagram illustrating an example of working of the feature management controller (184) of the electronic device (100), according to various embodiments. Referring to FIG. 7, at operation 1a, consider that the feature management controller (184) receives the text input as "Laughing out loudly!!! Ha ha ha . . . ". As the user keys in each term in the text input, the feature management controller (184) determines the features associated with the text input. For example, as the user provides the term "laughing", the feature management controller (184) identifies the feature associated with the text input as laugh, happiness, smile, etc. As the complete text input is provided the feature management controller (184) clearly identifies the features associated with the text input. At operation 2a, a function Ft indicates all the features associated with the text input. Similarly, at operation 1b, the feature management controller (184) receives the user strokes of the drawing. With each extra stroke provided by the user, the feature management controller (184) determines more features associated with the user strokes of the drawing. At operation 2b, a function Fi indicates all the features associated with the user strokes of the drawing.

At operation 3, the feature management controller (184) receives the combination of the features associated with the multi-modal inputs. In a first case, the Ft and Fi are completely available, and hence both the text input and the user strokes of the drawing are provided equal importance.

In a second case, the 3*Ft and Fi, features associated with the user strokes are partially available and the features associated with the text input are completely available. The feature management controller (184) classifies the features associated with the text input as the dominant feature and the features associated with the user strokes of the drawing as the non-dominant feature. If the context associated with the text input is coherent then the feature management controller (184) classifies the features associated with the text input as the dominant feature and the features associated with the user strokes of the drawing as the non-dominant feature.

In a third case, the Ft and 3*Fi, features associated with the text input are partially available and the features associated with the user strokes are completely available. The feature management controller (184) classifies the features associated with the user strokes of the drawing as the dominant feature and the features associated with the text input as the non-dominant feature. If the context associated with the user strokes of the drawing is coherent then the feature management controller (184) classifies the features associated with the user strokes of the drawing as the dominant feature and the features associated with the text input as the non-dominant feature.

Figure 8:
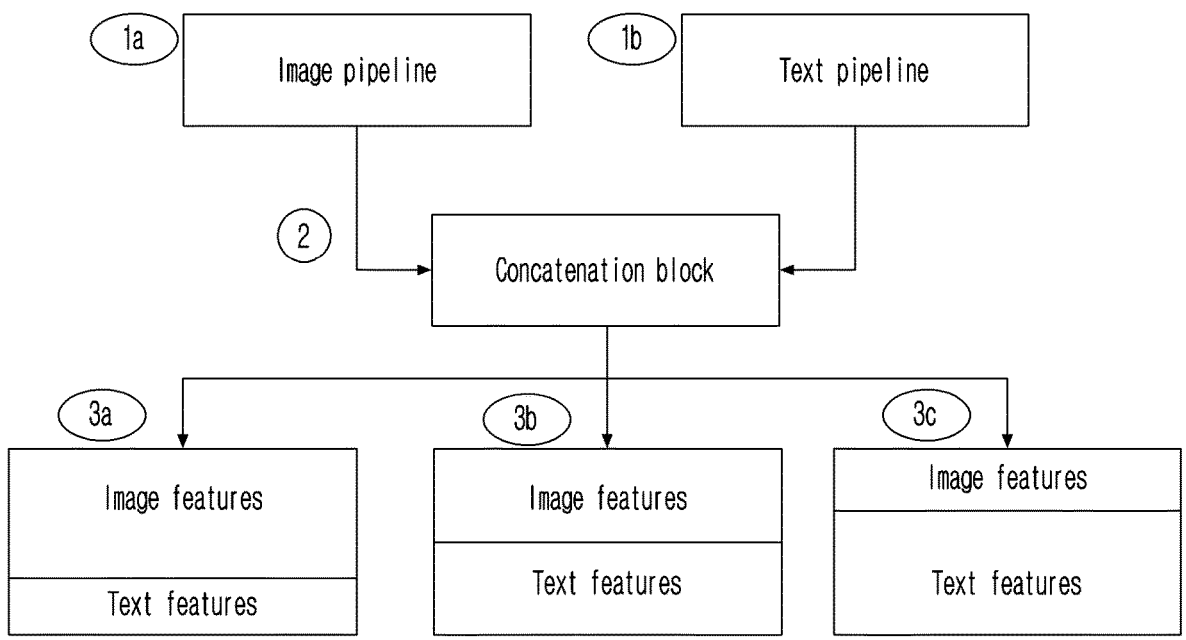
FIG. 8 is a diagram illustrating an example classification of features associated with text input and features associated with user strokes into a dominant feature and a non-dominant feature, according to various embodiments.

FIG. 8 is a diagram illustrating an example classification of features associated with text input and the features associated with user strokes into the dominant feature and the non-dominant feature, according to various embodiments. Referring to FIG. 8, at operation 1a, the image pipeline is provided which includes extracting features associated with the user strokes of the drawings which is converted into the image. The feature associated with the user strokes of the drawing are extracted from the input image using the regular CNN with MaxPool layer is used. At operation 1b, the text pipeline is provided which includes character CNN with vocab size of 70 comprising of lowercase, uppercase alphabets, punctuation, numbers and white space. From the text input a 70 dimensional embedding is obtained which is then passed through a series of 1D Convolutional, Maxpool and Dropout layers. At operation 2, the features associated with the text input and the features associated with the user strokes of the drawing are provided to a concatenation block of the SAM-Net DNN model (186). An early concatenation or a late concatenation can be performed. The late concatenation may be performed so that as much information as possible is extracted from each of the modalities before fusing them. The early concatenation is performed when raw features of the modalities are to be fused.

At operation 3a, in prediction case, along with the text input completely drawn image is also available. The feature associated with the user strokes of the drawing dominate and performs the better, since it has complete image context to extract and process. This is evident in operation 5a. At operation 3b, the scenario includes both the feature associated with the user strokes of the drawing and the features associated with text input are both completely available and the electronic device (100) considers both the feature associated with the user strokes of the drawing and the features associated with text input as dominant features.

At operation 3c, in completion scenario where the text context is fully available and the image is incrementally updated stroke by stroke, the feature associated with the text input is dominant and performs better. Because it gives more priority to the text context than the image input, as evident in the operation 4c. Table. 1 illustrates the performance of the electronic device (100) under various scenarios of predicting the drawings along with memory requirement and performance response time.

TABLE 1

| Various scenarios | Top 1 Accuracy | Top 3 Accuracy | Memory (ROM) | Performance (Response time) |
| --- | --- | --- | --- | --- |
| Image only | 55.53 | 72.43 | 2.18 MB | 50 ms |
| Image only + Emoji to Emoji prediction | 58.43 | 76.40 | 2.18 MB | 53 ms |
| SAM-Net (Early concatenation) | 70.24 | 85.12 | 2.5 MB | 60 ms |
| SAM-Net (Late concatenation) | 77.51 | 86.04 | 2.5 MB | 60 ms |

Figure 9:
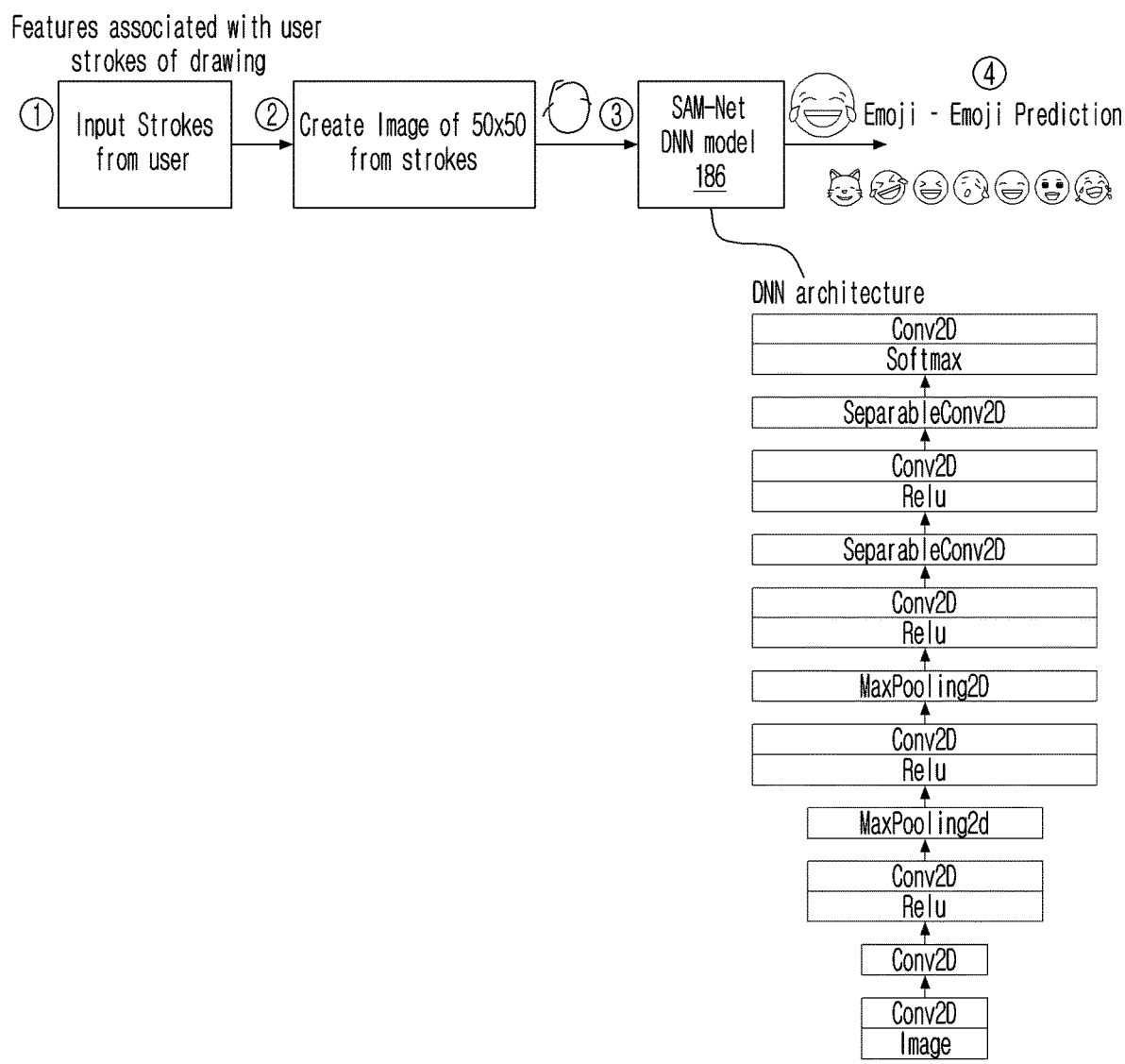
FIG. 9 is a diagram illustrating an example prediction of the drawings when only user strokes are provided as input, according to various embodiments.

FIG. 9 is a diagram illustrating an example prediction of the drawings when only the user strokes are provided as input, according to various embodiments. Referring to FIG. 9, at operation 1, the electronic device (100) receives the input strokes of the drawing from the user and determines the features associated with the user strokes of the drawing. At operation 2, the electronic device (100) generates an image of the predefined size such as 50×50 resolution from the user strokes of the drawing and at operation 3, the SAM-Net DNN model (186) receives the image as input. At operation 4, the electronic device (100) performs the image classification for the input drawings and provides the emoji-emoji prediction. Here, the electronic device (100) does not take the text context in consideration while providing the emoji-emoji prediction. As a result, the user has to draw near to complete image to get the correct prediction of the emoji.

Table. 2 provides key performance indicators for the emoji-emoji prediction using only the user strokes of the drawing.

TABLE 2

| Type | Top 1 | Top 3 | Size | Time |
| --- | --- | --- | --- | --- |
| Image only | 55.53 | 72.43 | 2.18 MB | 50 ms |

Figure 10A:
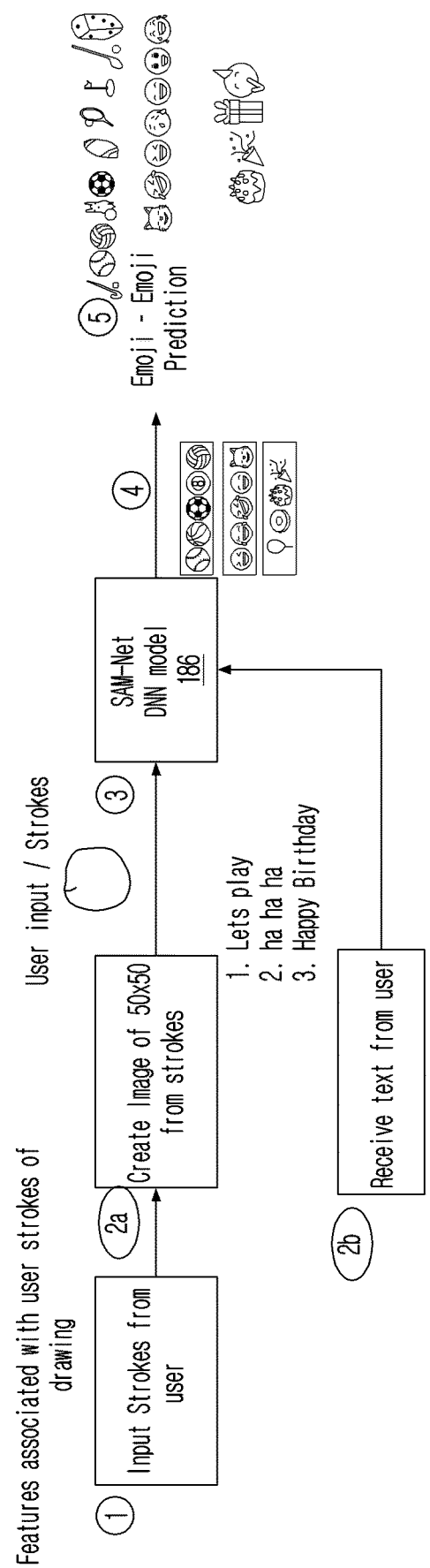
FIGS. 10A and 10B are diagrams illustrating an example prediction of the drawings when both the user strokes and the text input are provided as input with early concatenation, according to various embodiments.
Figure 10B:
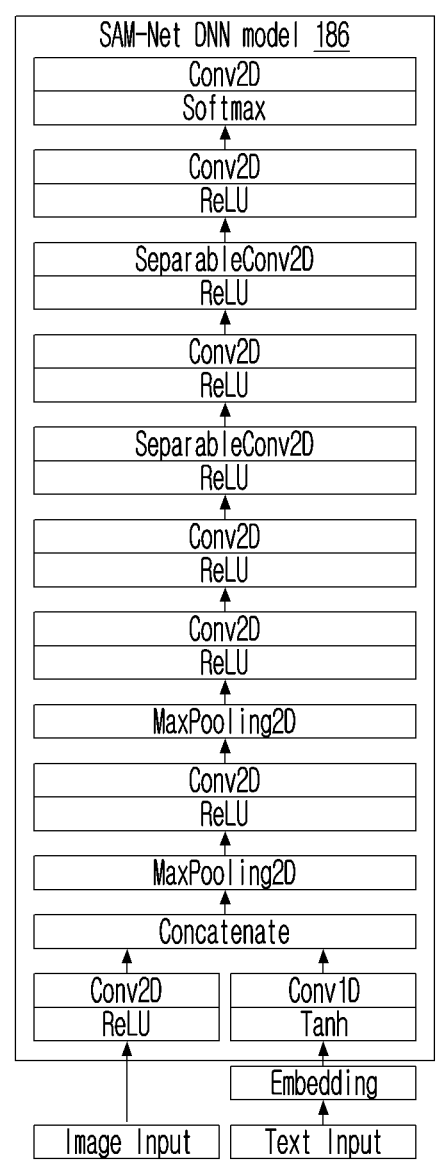

FIGS. 10A and 10B are diagrams illustrating example prediction of the drawings when both the user strokes and the text input are provided as input with early concatenation, according to various embodiments. Referring to FIG. 10A, at operation 1, the electronic device (100) receives the input strokes of the drawing from the user and determines the features associated with the user strokes of the drawing. At operation 2a, the electronic device (100) generates an image of the predefined size such as 50×50 resolution from the user strokes of the drawing. At operation 2b, the electronic device (100) receives the text input from the user and determines the textual context of the text input. The textual context can be for example, let's play, ha ha ha or Happy Birthday, etc. At operation 3, the SAM-Net DNN model (186) receives the image as input and the text input and performs the early concatenation (using the SAM-Net DNN model (186) shown in FIG. 10B) to fuse raw features from the image and the text input. Further, both the image and the text input are brought to the same vector space and fused. At operation 4, the electronic device (100) classifies the drawings and at operation 5 provides the emoji to emoji prediction.

In the case of the early concatenation, after concatenation model is trained the SAM-Net DNN model (186) gives greater benefit over the image only model (as explained in FIG. 9) as the text features are also available. Since the text features are considered, the user need not draw the user strokes completely to get the correct prediction. The early concatenation improves the Drawing Stroke Saved Ratio (DSR) which is provided as:

DSR=(No. of strokes required−No. of strokes drawn)/(No. of strokes required)

Table. 3 provides the KPIs for the prediction of the emojis using SAM-Net DNN model (186) with early concatenation.

TABLE 3

| Type | Top 1 | Top 2 | Top 3 | Size | Time |
|---|---|---|---|---|---|
| Early Concatenation | 70.24 | 78.51 | 85.12 | 2.5 MB | 60 ms |

Figure 11A:
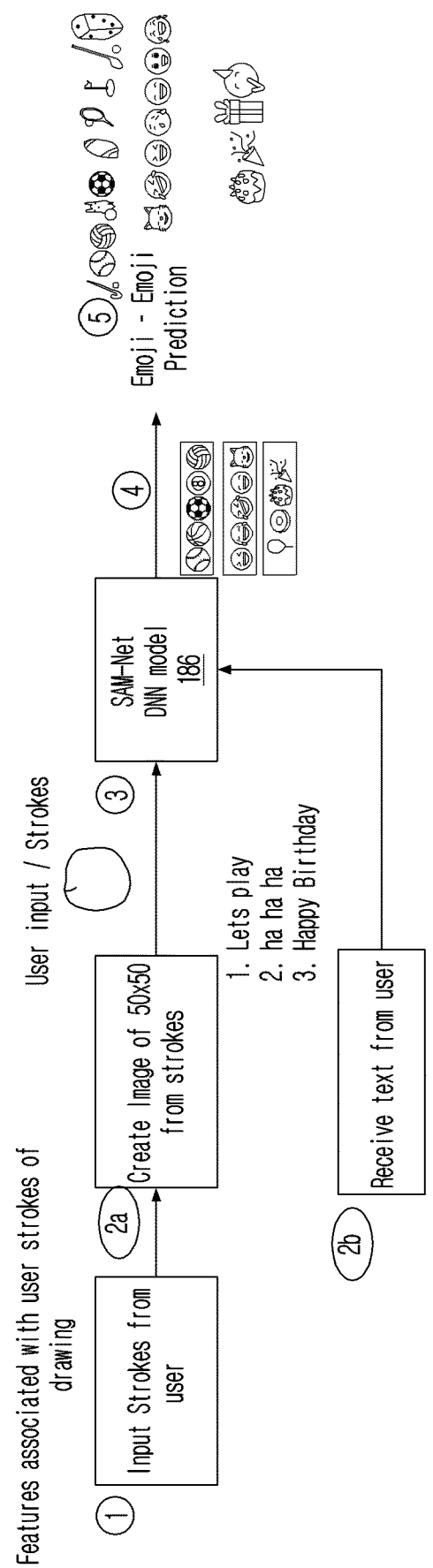
FIGS. 11A and 11B are diagrams illustrating an example prediction of the drawings when both the user strokes and the text input are provided as input with late concatenation, according to various embodiments.
Figure 11B:
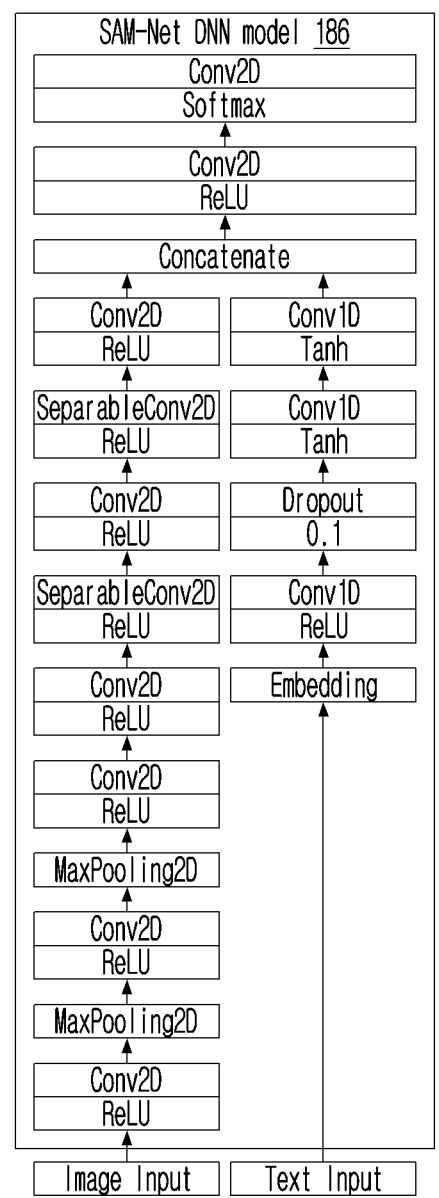

FIGS. 11A and 11B are diagrams illustrating example prediction of the drawings when both the user strokes and the text input are provided as input with late concatenation, according to various embodiments. Referring to FIG. 11A, at operation 1, the electronic device (100) receives the input strokes of the drawing from the user and determines the features associated with the user strokes of the drawing. At operation 2a, the electronic device (100) generates an image of the predefined size such as 50×50 resolution from the user strokes of the drawing. At operation 2b, the electronic device (100) receives the text input from the user and determines the textual context of the text input. The textual context can be for example, let's play, ha ha ha or Happy Birthday, etc. At operation 3, the SAM-Net DNN model (186) receives the image as input and the text input and performs the late concatenation (using the SAM-Net DNN model (186) shown in FIG. 11B) to extract as much information as possible from each of the image input and the text input before fusing them. At operation 4, the electronic device (100) classifies the drawings and at operation 5 provides the emoji to emoji prediction. Here, since the text features are considered, the user need not draw the user strokes completely to get the correct prediction.

Table. 4 provides the KPIs for the prediction of the emojis using SAM-Net DNN model (186) with the late concatenation.

TABLE 4

| Type | Top 1 | Top 2 | Top 3 | Size | Time |
|---|---|---|---|---|---|
| Late Concatenation | 77.51 | 83.72 | 86.04 | 2.5 MB | 60 ms |

Figure 12A:
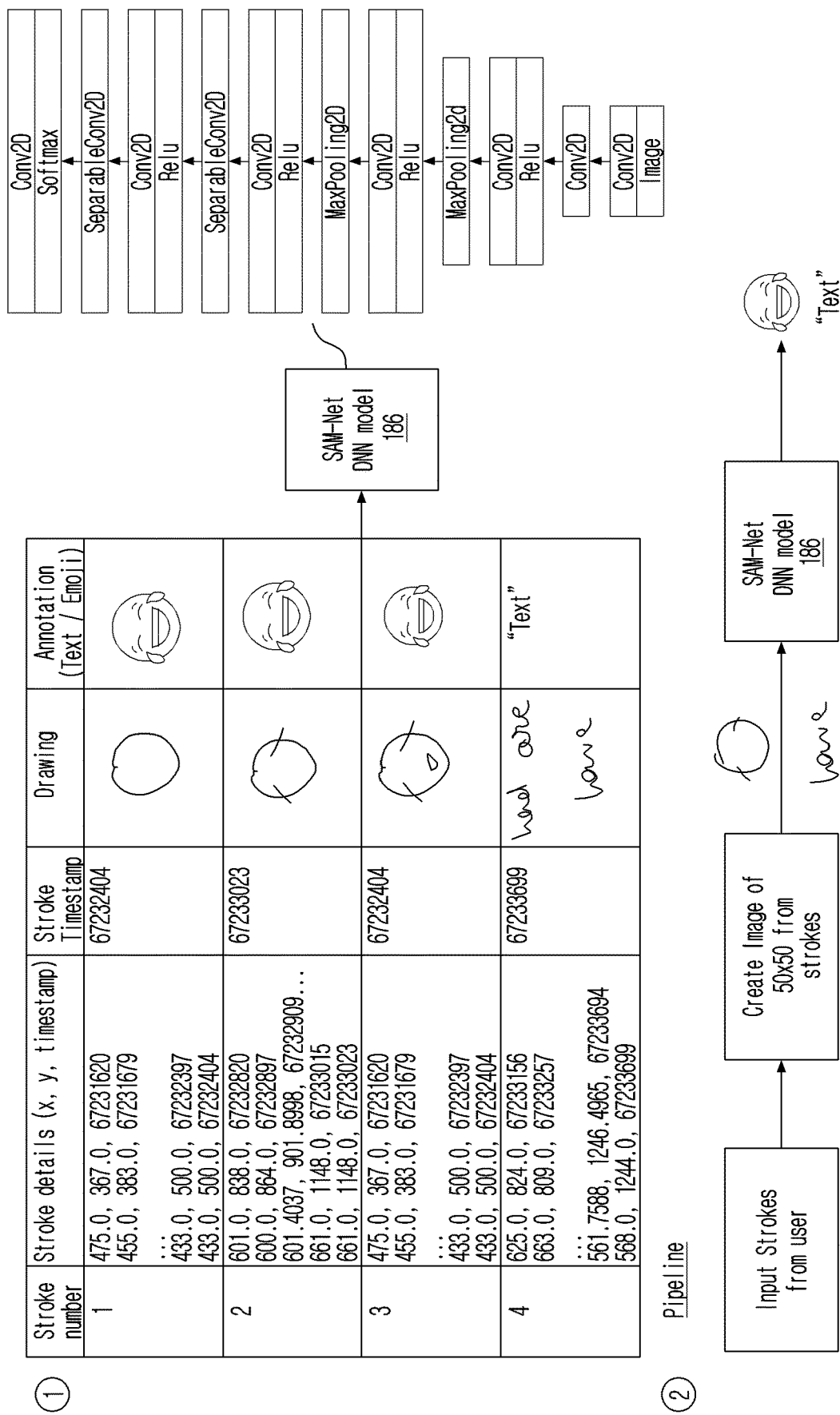
FIG. 12A is a diagram illustrating an example conflict resolution while predicting the drawings using the SAM-Net DNN model, according to various embodiments.

FIG. 12A is a diagram illustrating an example conflict resolution while predicting the drawings using the SAM-Net DNN model (186), according to various embodiments. Referring to FIG. 12A, consider a scenario where the user has provided a first set of the user strokes indicating some text content and followed it with a second set of the user strokes of the drawing. In such a scenario, there is a possibility that the electronic device (100) interprets the second set of the user strokes of the drawing also as text content rather than as the drawing/emoji which leads to a conflict, as shown in 2.

The method resolves the above mentioned conflict by introducing a class in the SAM-Net DNN model (186) called "Text class" to differentiate the text and emoji. The Text class is provided to the SAM-Net DNN model (186) during training phase so that the SAM-Net DNN model (186) is capable of resolving the conflict as mentioned above.

Figure 12B:
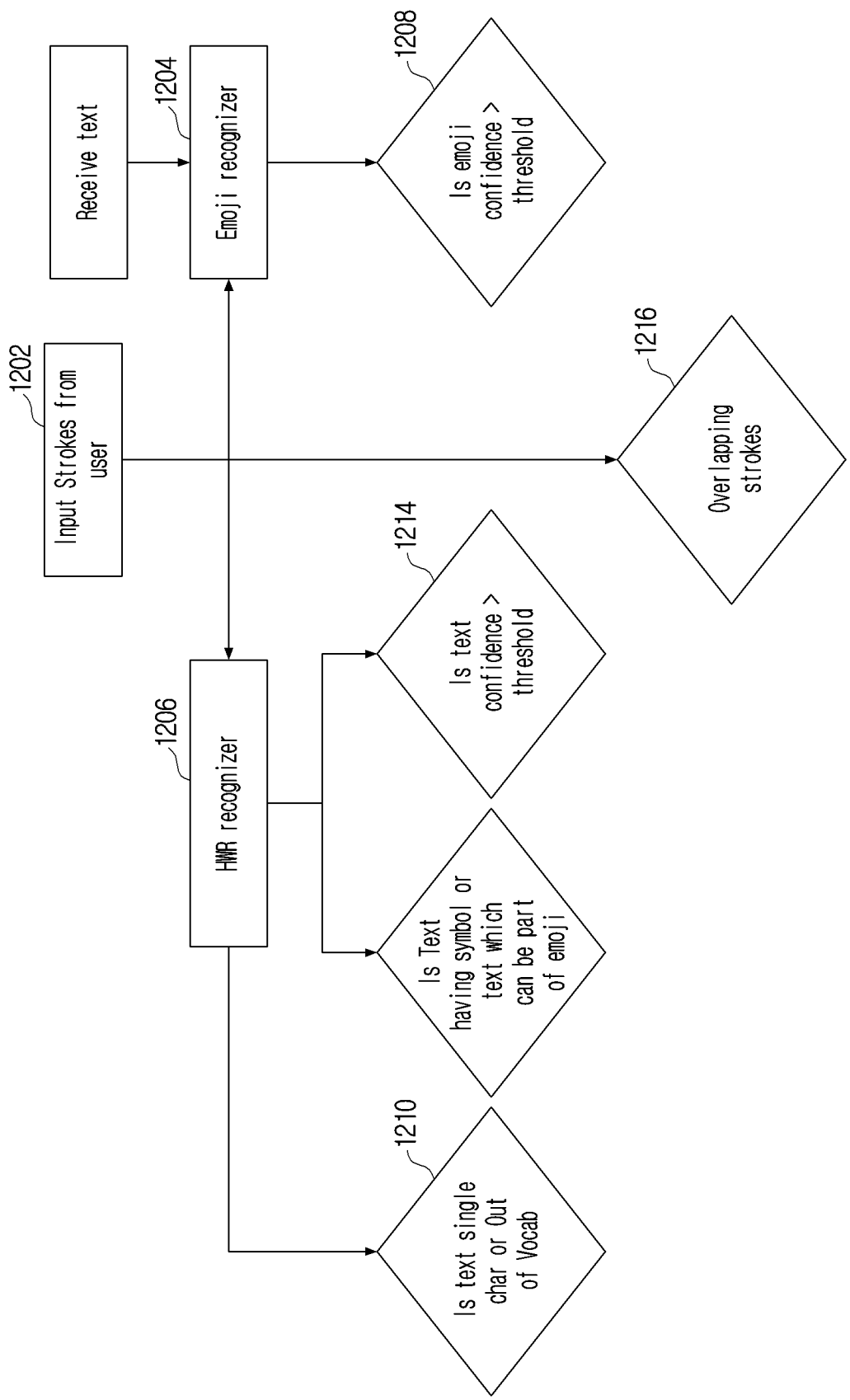
FIG. 12B is a flowchart illustrating example conflict resolution while predicting the drawings using Heuristics technique, according to various embodiments.

FIG. 12B is a flowchart illustrating example conflict resolution while predicting the drawings using Heuristics technique, according to various embodiments. Referring to FIG. 12B, in conjunction with FIG. 12A, the above mentioned conflict scenario can also be resolved using the Heuristics technique. In the Heuristics technique, at operation 1202, the user strokes of the drawing are received, at operation 1204, the emoji recognizer recognizes the emoji and at operation 1206, the handwriting recognizer recognizes the text input. Based on the above mentioned three inputs the conflict regarding the text and emoji/drawing is resolved as follows:

1. Text having symbol (@, +, x, S) or text which is part of emoji (100) and hwr recognizer confidence> threshold->Take text (operation 1214).
2. Text is single character or OOV and Overlapping strokes->Take emoji (operation 1216).
3. Text is single character or OOV and emoji confidence>threshold->Take emoji (operation 1208).
4. Text is single char and is part of vocab like (I, A, etc.)->Take text (operation 1210).

The table. 5 illustrate various scenarios of conflict resolution while predicting the drawings.

TABLE 5

| Conflict type | Text-Emoji samples | Examples when text should be preferred | Resolution Strategy |
|---|---|---|---|
| Symbol text-Emoji | +-✚<br>x-✗, ✱<br>$-💲 | 10 + 20 = 30<br>2 × 3 = 6<br>You have to pay me 20$ | 1. Input field type is number/email-Take as text |
| Emoji having text | @-📧<br>100-100 | abc@xyz.com<br>20 + 100 = 120 | 2. Pre-text not available-Take as text<br>3. Pre-text Available-Text dominated model output |

Figure 13:
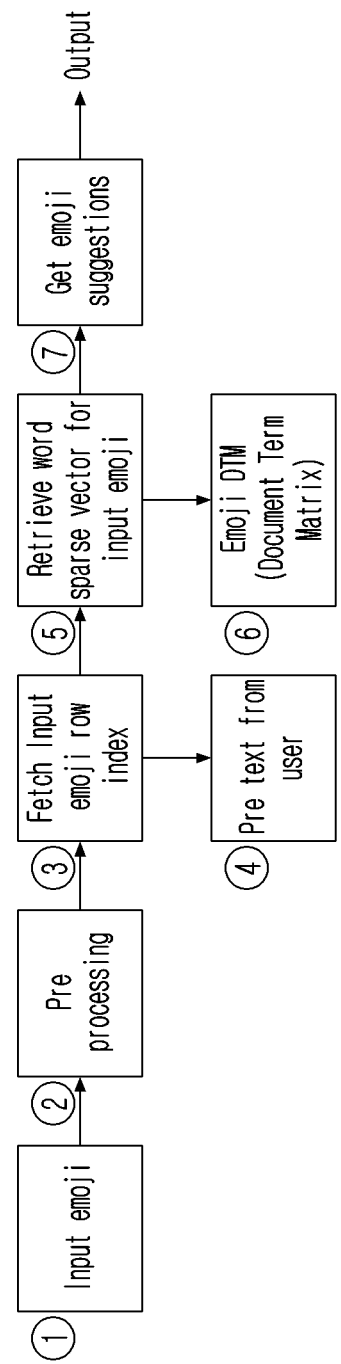
FIG. 13 is a diagram illustrating an example prediction of secondary drawings corresponding to predicted primary drawing, according to various embodiments.

FIG. 13 is a diagram illustrating an example prediction of secondary drawings corresponding to the predicted primary drawing, according to various embodiments. Referring to FIG. 13, consider that the user has provide the user strokes for the drawing and received some prediction of the drawing from the electronic device (100). However, there can be scenario where the user has received a red heart emoji (prediction) but there are other emojis related to the heart emoji such as for example a green heart emoji or a broken heart emoji, etc.

At operation 1, the electronic device (100) receives the input emoji (emoji predicted by the electronic device (100) based on the user strokes of the drawings) and pre-processed the input emoji (operation 2). At operation 3, the electronic device (100) determines an input row index of the input emoji using an emoji vocabulary (operation 4). Further, at operation 5, the electronic device (100) determines the word sparse vector for the input emoji from a document term matrix (DTM) (operation 6) and at operation 7, the electronic device (100) determines multiple similar emojis/drawings which are related to the input emoji and outputs them. Therefore, the method is expanded to predict emojis using emojis. Further, the key performance indicators are provided when the image only input is used and also when image only input is used along with Emoji to Emoji prediction in table. 6.

TABLE 6

| Type | Top 1 | Top 3 | Size | Time |
|---|---|---|---|---|
| Image only | 55.53 | 72.43 | 2.18 MB | 50 ms |
| Image only + Emoji to Emoji prediction | 58.43 | 76.40 | 2.18 MB | 53 ms |

FIG. 14 is a diagram illustrating various examples of supported emojis, according to various embodiments. Referring to FIG. 14, 75% of total emojis usage is from 100 unique emojis for the implementation of the method. The emojis are selected for example but not limited to, based on "Min Strokes", "Overall Drawing effort" and "Usage in Big data". The number of emojis described throughout the disclosure and FIG. 14 are used for description purpose only and are not limited to the same.

The foregoing description of the various example embodiments may, by applying current knowledge, be readily modified and/or adapted for various applications by those skilled in the art without departing from the scope of the disclosure, and, therefore, such adaptations and modifications should and are intended to be comprehended within the scope of the disclosed embodiments. It is to be understood that the phraseology or terminology employed herein is for the purpose of description and not of limitation. Therefore, while the embodiments herein have been described in terms of example embodiments, those skilled in the art will recognize that the embodiments herein can be practiced with modification within the scope of the embodiments as described herein. While the disclosure has been illustrated and described with reference to various example embodiments, it will be understood that the various example embodiments are intended to be illustrative, not limiting. It will also be understood that any of the embodiment(s) described herein may be used in conjunction with any other embodiment(s) described herein.

What is claimed is:

1. A method for predicting multi-modal drawing by an electronic device, wherein the method comprises:
    receiving, by the electronic device, at least one of a text input and strokes of a drawing on a screen of the electronic device;
    determining, by the electronic device, features associated with the text input and features associated with the strokes of the drawing;
    classifying, by the electronic device, the features associated with the text input and the features associated with the strokes of the drawing into one of a dominant feature and a non-dominant feature;
    performing, by the electronic device, concatenation of the features associated with the text input and the features associated with the strokes of the drawing based on the classification;
    classifying, by the electronic device, the strokes of the drawing based on the concatenation into at least one category using a deep neural network (DNN) model; and
    predicting, by the electronic device, a plurality of primary drawings corresponding to the at least one category.

2. The method as claimed in claim 1, wherein the concatenation is performed as one of an early concatenation and a late concatenation of the features associated with the text input and the features associated with the strokes of the drawing based on the classification.

3. The method as claimed in claim 1, wherein classifying, by the electronic device, the features associated with the text input and the features associated with the strokes of the drawing into one of the dominant feature and the non-dominant feature comprises:
    determining, by the electronic device, that one of: the features associated with the text input and the features associated with the strokes of the drawing are completely available, and one of a context associated with the text input and a context associated with the strokes of the drawing is coherent; and
    classifying, by the electronic device:
    the features associated with the text input as the dominant feature and the features associated with the strokes of the drawing as the non-dominant feature, in response to determining that at least one of: the features associated with the text input are completely available and the context associated with the text input is coherent, and
    the features associated with the strokes of the drawing as the dominant feature and the features associated with the text input as the non-dominant feature, in response to determining that at least one of: the features associated with the strokes of the drawing are completely available and the context associated with the user strokes of the drawing is coherent.

4. The method as claimed in claim 1, wherein classifying, by the electronic device, the strokes of the drawing based on the concatenation into the at least one category using the DNN model comprises:
    identifying, by the electronic device, a weight of each of text layers and drawing layers of the DNN model based on the determined dominant feature;
    applying, by the electronic device, a dynamic-interpolation with the identified weights for each of the text layers and the drawing layers of the DNN model; and
    concatenating, by the electronic device, the features associated with the text input and the features associated with the strokes of the drawing; and classifying, by the electronic device, the strokes of the drawing based on the concatenation into at least one category.

5. The method as claimed in claim 1, further comprising:
receiving, by the electronic device, at least one predicted primary drawing of the plurality of predicted primary drawings;
determining, by the electronic device, an input row index of the at least one predicted primary drawing;
determining, by the electronic device, a word sparse vector for the at least one predicted primary drawing from a document term matrix (DTM) of the at least one predicted primary drawing; and
determining, by the electronic device, a plurality of secondary drawings corresponding the at least one predicted primary drawing.

6. The method as claimed in claim 1, wherein the plurality of primary drawings corresponding to the at least one category are provided in a specific order of predictions.

7. The method as claimed in claim 1, wherein predicting, by the electronic device, the plurality of primary drawings corresponding to the at least one category comprises:
determining, by the electronic device, a drawing-stroke savings ratio (DSR) indicating a number of strokes saved for a user in the drawing input;
determining, by the electronic device, a specific order of the plurality of drawings corresponding to at least one drawing category; and
predicting, by the electronic device, the plurality of primary drawings corresponding to the at least one category, wherein the plurality of primary drawings is predicted with a relatively low number of strokes.

8. The method as claimed in claim 1, further comprising:
receiving, by the electronic device, a next set of strokes;
determining, by the electronic device, features of the next set of strokes;
determining, by the electronic device, that features of the next set of strokes belongs to at least one of a text and a drawing;
resolving, by the electronic device, a conflict whether the features of the next set of strokes belongs to at least one of the text and the drawing, wherein the resolution is performed using one of the DNN model and a Heuristics technique; and
predicting, by the electronic device, the next set of strokes to be one of the text and the drawing.

9. An electronic device configured to predict multi-modal drawing, wherein the electronic device comprises:
a memory;
a processor coupled to the memory;
a communicator comprising communication circuitry coupled to the memory (120) and the processor;
a drawing management controller coupled to the memory, the processor and the communicator, and configured to:
receive at least one of a text input and strokes of a drawing on a screen of the electronic device,
determine features associated with the text input and features associated with the strokes of the drawing;
classify the features associated with the text input and the features associated with the strokes of the drawing into one of a dominant feature and a non-dominant feature;
perform concatenation of the features associated with the text input and the features associated with the strokes of the drawing based on the classification;
classify the strokes of the drawing based on the concatenation into at least one category using a deep neural network (DNN) model; and
predict a plurality of primary drawings corresponding to the at least one category.

10. The electronic device as claimed in claim 9, wherein the concatenation includes at least one of an early concatenation and a late concatenation of the features associated with the text input and the features associated with the strokes of the drawing based on the classification.

11. The electronic device as claimed in claim 9, wherein the drawing management controller is configured to classify the features associated with the text input and the features associated with the strokes of the drawing into one of the dominant feature and the non-dominant feature, wherein the classifying comprises:
determining that one of: the features associated with the text input and the features associated with the strokes of the drawing is completely available, and one of a context associated with the text input and a context associated with the strokes of the drawing is coherent; and
classifying:
the features associated with the text input as the dominant feature and the features associated with the strokes of the drawing as the non-dominant feature, in response to determining that at least one of: the features associated with the text input are completely available and the context associated with the text input is coherent, and
the features associated with the strokes of the drawing as the dominant feature and the features associated with the text input as the non-dominant feature, in response to determining that at least one of: the features associated with the strokes of the drawing are completely available and the context associated with the strokes of the drawing is coherent.

12. The electronic device as claimed in claim 9, wherein the drawing management controller is configured to classify the strokes of the drawing based on the concatenation into the at least one category using the DNN model and the classifying comprises:
identifying a weight of each of text layers and drawing layers of the DNN model based on the determined dominant feature;
applying a dynamic-interpolation with the identified weights for each of the text layers and the drawing layers of the DNN model; and
concatenating the features associated with the text input and the features associated with the strokes of the drawing; and
classifying the strokes of the drawing based on the concatenation into at least one category.

13. The electronic device as claimed in claim 9, wherein the drawing management controller is further configured to:
receive at least one predicted primary drawing of the plurality of predicted primary drawings;
determine an input row index of the at least one predicted primary drawing;
determine a word sparse vector for the at least one predicted primary drawing from a document term matrix (DTM) of the at least one predicted primary drawing; and
determine a plurality of secondary drawings corresponding the at least one predicted primary drawing.

14. The electronic device as claimed in claim 9, wherein the plurality of primary drawings corresponding to the at least one category are provided in a specific order of predictions.

15. The electronic device as claimed in claim 9, wherein the drawing management controller is configured to predict the plurality of primary drawings corresponding to the at least one category, wherein the predicting comprises:
- determining a drawing-stroke savings ratio (DSR) indicating a number of strokes saved for a user in the drawing input;
- determining a specific order of the plurality of drawings corresponding to at least one drawing category; and
- predicting the plurality of primary drawings corresponding to the at least one category, wherein the plurality of primary drawings is predicted with a relatively low number of user strokes.

16. The electronic device as claimed in claim 9, wherein the drawing management controller is further configured to:
- receive a next set of strokes;
- determine features of the next set of strokes;
- determine that features of the next set of strokes belongs to at least one of a text and a drawing;
- resolve a conflict whether the features of the next set of strokes belongs to at least one of the text and the drawing, wherein the resolution is performed using one of the DNN model and a Heuristics technique; and
- predict the next set of strokes to be one of the text and the drawing.

\* \* \* \* \*